Nov. 28, 1944.     A. H. BENNETT     2,363,770
LENS SYSTEM
Filed Sept. 22, 1943
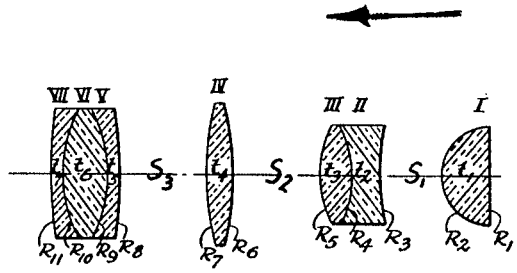
INVENTOR.
ALVA H. BENNETT
BY Raymond A. Paquin
ATTORNEY Patented Nov. 28, 1944

2,363,770

UNITED STATES PATENT OFFICE 2,363,770

LENS SYSTEM

Alva H. Bennett, Kenmore, N. Y., assignor to Spencer Lens Company, Buffalo, N. Y., a corporation of New York Application September 22, 1943, Serial No. 503,364

2 Claims. (Cl. 88—57)

This invention relates to objectives particularly adapted for use in microscopes or the like and more particularly to an objective which gives good definition and freedom from axial color.

An object of the invention is to provide a new and improved objective particularly adapted for microscopes or the like, although it may be used for photographic or projection purposes, which objective provides good definition and freedom from axial color.

Referring to the drawing; the single figure is a sectional view of an optical system embodying the invention.

Referring more particularly to the drawing the system comprises seven elements numbered I to VII inclusive from front to rear.

The element I is of barium crown glass having an index of refraction of approximately 1.57 and an Abbé number of approximately 57.4. The front surface $R_1$ is flat and the rear surface $R_2$ has a radius of approximately —3.72 mm. The thickness of this element is approximately 3.72 mm.

The separation $S_1$ between the elements I and II is approximately .7 mm.

The elements II and III comprise a cemented doublet of which the element II is a low barium flint glass having a refractive index of approximately 1.58 and an Abbé number of approximately 46.0.

The radius $R_3$ is approximately —26.65 mm. and the radius $R_4$ is approximately 9.09 mm.

The thickness $t_2$ of the element II is approximately 2.40 mm.

The element III is of fluorite and has an index of refraction of approximately 1.43 and an Abbé number of approximately 95.4. The radius $R_5$ of this element is approximately —7.18 mm. and its thickness $t_3$ is approximately 2.50 mm.

The separation $S_2$ between the elements III and IV is approximately 6.86 mm.

The element IV is of low barium crown glass having a refractive index of approximately 1.54 and an Abbé number of approximately 59.9. The thickness $t_4$ of this element is approximately 2.25 mm. and the radius of its front surface $R_6$ is approximately 25.05 mm. while the radius of its rear surface $R_7$ is approximately 18.19 mm.

The separation $S_3$ between the elements IV and V is approximately 1.44 mm.

The elements V, VI and VII are preferably a cemented triplet of which the element V is of a barium crown glass having an index of refraction of approximately 1.57 and an Abbé number of approximately 57.4. The thickness $t_5$ is approximately .95 mm. and the radius $R_8$ approximately 107.42 mm. while the radius $R_9$ of the rear surface is approximately —9.00 mm.

The element VI is of fluorite having an index of refraction of approximately 1.43 and an Abbé number of approximately 95.4.

The thickness $t_6$ of this element is approximately 3.60 mm. and the radius of the rear surface $R_{10}$ is approximately —9.05 mm.

The element VII is of low barium flint glass having an index of refraction of approximately 1.58 and an Abbé number of approximately 46.0. The thickness $t_7$ of this element is approximately .95 mm. and the radius of the rear surface $R_{11}$ is approximately —34.69.

It will be noted that the elements I and V are of similar glass as are the elements II and VII while the elements III and VI are of fluorite.

The magnification of the objective is approximately $20x$ and its focal length approximately 8 mm.

From the foregoing it will be seen that I have provided simple, efficient and economical means for obtaining the objects and advantages of the invention.

Having described my invention, I claim:

1. An objective lens system comprising seven lens elements, the first of said elements being a single lens of glass having an index of refraction of approximately 1.57 and an Abbé number of approximately 57.4, the front surface thereof being approximately flat and the rear surface thereof having a radius of approximately —3.72 mm. and the thickness of said element being approximately 3.72 mm., a doublet comprising a front element having an index of refraction of approximately 1.58 and an Abbé number of approximately 46.0, the radius of said front surface being approximately —26.65 mm., the radius of the rear surface approximately 9.09 mm. and the thickness of said element approximately 2.40 mm., and the rear element having an index of refraction of approximately 1.43 and an Abbé number of approximately 95.4, the radius of the front surface being approximately 9.09 mm. and the radius of the rear surface approximately —7.18 mm. and the thickness of said element approximately 2.50 mm., the next element being a single lens having an index of refraction of approximately 1.54 and an Abbé number of approximately 59.9, the radius of the front surface being approximately 25.05 mm. and the radius of its rear surface approximately 18.19 mm., the thickness of said element being approximately 2.25 mm., and the next member comprising a triplet consisting of a front element having an index of refraction of approximately 1.57 and an Abbé number of approximately 57.4, the front surface having a radius of approximately 107.42 and the radius of its rear surface approximately —9.00 mm. and its thickness being approximately .95 mm., the center element having an index of refraction of approximately 1.43 and an Abbé number of approximately 95.4, the front surface thereof having a radius of approximately —9.00 mm. and the rear surface a radius of approximately —9.05 mm. and its thickness being approximately 3.60 mm., and the rear element having an index of refraction of approximately 1.58 and an Abbé number of approximately 46.0 with the radius of its front surface being approximately —9.05 mm. and the radius of its rear surface approximately —34.69 mm. and its thickness approximately .95 mm., the said objective having a magnification of approximately $20x$ and a focal length of approximately 8 mm., the separation between the front element and the second element being approximately .7 mm., the separation between the third and fourth elements 6.86 mm. and the separation between the fourth and fifth elements 1.44 mm.

2. A lens system of the character described comprising four axial components, the second of which is a cemented doublet and the fourth of which is a cemented triplet, and having substantially the numerical data set forth in the following table wherein $R_1$ $R_2$ . . . designate the radii of the successive lens surfaces counting from the front, $t_1$ $t_2$ . . . the axial thickness of the individual elements and $S_1$ $S_2$ and $S_3$ the axial air separation, $N_D$ the mean refractive index and V the Abbé $\nu$ number.

| Lens | $N_D$ | $\nu$ | Radii | Spacings |
|---|---|---|---|---|
| I | 1.57 | 57.4 | $R_1$ = infinity. $R_2$ = —3.72 mm. | $t_1$ = 3.72 mm. |
| II | 1.58 | 46.0 | $R_3$ = —26.65 mm. $R_4$ = +9.09 mm. | $S_1$ = .7 mm. $t_2$ = 2.40 mm. |
| III | 1.43 | 95.4 | $R_5$ = —7.18 mm. | $t_3$ = 2.50 mm. $S_2$ = 6.86 mm. |
| IV | 1.54 | 59.9 | $R_6$ = +25.05 mm. $R_7$ = —18.19 mm. | $t_4$ = 2.25 mm. |
| V | 1.57 | 57.4 | $R_8$ = +107.42 mm. $R_9$ = —9.00 mm. | $S_3$ = 1.44 mm. $t_5$ = .95 mm. |
| VI | 1.43 | 95.4 | $R_{10}$ = —9.05 mm. | $t_6$ = 3.60 mm. |
| VII | 1.58 | 46.0 | $R_{11}$ = —34.69 mm. | $t_7$ = .95 mm. |

ALVA H. BENNETT.